(12) United States Patent
Ye et al.

(10) Patent No.: US 10,329,117 B2
(45) Date of Patent: Jun. 25, 2019

(54) ENERGY-SAVING TRACTION-TYPE ELEVATOR (71) Applicants: Hangzhou Simaero Technology Co., Ltd., Hangzhou, Zhejiang Province (CN); Rongwei Ye, Hangzhou, Zhejiang Province (CN)

(72) Inventors: Rongwei Ye, Hangzhou (CN); Xiuxiu Wang, Hangzhou (CN); Yanbin Lv, Hangzhou (CN); Dazhi He, Hangzhou (CN)

(73) Assignee: Hangzhou Simaero Technology Co., Ltd. (CN)

( * ) Notice: Subject to any disclaimer, the term of this patent is extended or adjusted under 35 U.S.C. 154(b) by 445 days.

(21) Appl. No.: 15/027,664

(22) PCT Filed: Dec. 10, 2014

(86) PCT No.: PCT/CN2014/093419
§ 371 (c)(1),
(2) Date: Apr. 6, 2016

(87) PCT Pub. No.: WO2015/090149
PCT Pub. Date: Jun. 25, 2015

(65) Prior Publication Data
US 2016/0244296 A1  Aug. 25, 2016

(30) Foreign Application Priority Data
Dec. 17, 2013 (CN) .......................... 2013 1 0695900

(51) Int. Cl.
| | | |
|---|---|---|
| *B66B 1/34* | (2006.01) | |
| *B66B 1/28* | (2006.01) | |
| *B66B 17/12* | (2006.01) | |
| *B66B 11/04* | (2006.01) | |
| *B66B 5/00* | (2006.01) | |
| *B66B 9/00* | (2006.01) | |

(52) U.S. Cl.
CPC .............. *B66B 1/28* (2013.01); *B66B 5/0018* (2013.01); *B66B 9/00* (2013.01); *B66B 11/043* (2013.01);
(Continued)

(58) Field of Classification Search
CPC ........... B66B 1/28; B66B 5/0018; B66B 9/00; B66B 11/043; B66B 11/0492; B66B 17/12; Y02B 50/144
(Continued)

(56) References Cited

U.S. PATENT DOCUMENTS

3,845,842 A * 11/1974 Johnson .............. B66B 11/0045
187/266
4,236,605 A * 12/1980 Lindbergh .............. B66B 17/12
187/405
(Continued)

*Primary Examiner* — Anthony J Salata
(74) *Attorney, Agent, or Firm* — PROI Intellectual Property US (57) ABSTRACT

An energy-saving traction-type elevator and an energy-saving method therefor are presented. The traction-type elevator includes at least one counterbalance unit, each counterbalance unit comprising a traction machine. The traction-type elevator further includes an automatic transmission, a hoist-type lifting mechanism, a power-generating electric motor, and a controller provided in a machine room, and a car, a fixed counterweight and a balancing counterbalance provided in an elevator shaft. The energy-saving method applies the principle of moment balance, whereby adding a separate elevator balancing counterbalance to achieve intelligent counterbalancing of the elevator so that the elevator achieves relative balance, thereby reducing the traction moment and rate of work of the traction machine. When the potential energy of the elevator balancing counterbalance builds up to a high position, the power-generating electric motor can perform centralized power generation, aiding in energy recovery and use.

13 Claims, 3 Drawing Sheets

(52) U.S. Cl.
CPC .......... *B66B 11/0492* (2013.01); *B66B 17/12* (2013.01); *Y02B 50/144* (2013.01)

(58) Field of Classification Search
USPC ......... 187/247, 25, 261, 262, 265, 266, 277, 187/256, 361, 391, 393, 394, 404, 405, 187/414, 254
See application file for complete search history.

(56) References Cited

U.S. PATENT DOCUMENTS

| | | | | |
|---|---|---|---|---|
| 4,417,646 A * | 11/1983 | Lindbergh | ............... | F16F 15/28 187/405 |
| 4,708,224 A * | 11/1987 | Schrooder | ............ | B66B 1/2458 187/387 |
| 4,939,679 A * | 7/1990 | David | ................... | B66B 1/3484 187/292 |
| 5,117,945 A * | 6/1992 | Honda | .................... | B66B 7/068 187/264 |
| 6,857,506 B1 * | 2/2005 | Tyni | ...................... | B66B 1/2458 187/247 |
| 7,219,771 B2 * | 5/2007 | Augugliaro | ............. | B66B 17/12 187/404 |
| 7,387,192 B2 * | 6/2008 | Cloux | ..................... | B66B 17/12 187/404 |
| 7,971,688 B2 * | 7/2011 | Perala | ................... | B66B 1/3407 187/293 |
| 8,668,054 B2 * | 3/2014 | Silberhorn | ............. | B66B 17/12 187/249 |
| 9,573,789 B2 * | 2/2017 | Appana | ................. | B66B 1/2408 |
| 9,975,730 B2 * | 5/2018 | Perala | ................... | B66B 5/0087 |

* cited by examiner

| Table of practical operation cases of elevator | | | | | | | | | | |
|---|---|---|---|---|---|---|---|---|---|---|
| Call sequence No. | Floor where the car is located | Capacity | Floor that the car reaches | Moving distance of the car | Transmission ratio of the automatic transmission | Configured moving distance | Position of the balancing counterbalance | Car-side energy | Energy variation of the balancing counterbalance | Energy of the fixed counterweight |
| Initial | 1 | | | | | | 4 | | | |
| 1 | 1 | 0 | 11 | 30 | 0 | 0 | 4 | 30 | 0 | -30 |
| 2 | 11 | 10 | 1 | -30 | 0.25 | 7.5 | 11.5 | -60 | 30 | 30 |
| 3 | 1 | 0 | 11 | 30 | 0 | 0 | 11.5 | 30 | 0 | -30 |
| 4 | 11 | 10 | 1 | -30 | 0.25 | 7.5 | 19 | -60 | 30 | 30 |
| 5 | 1 | 0 | 11 | 30 | 0 | 0 | 19 | 30 | 0 | -30 |
| 6 | 11 | 10 | 1 | -30 | 0.25 | 7.5 | 26.5 | -60 | 30 | 30 |

The balancing counterbalance triggers the upper early warning position sensor 1.3 at a height of 26.4m, and the car levels to floor 1 nearby. In such circumstances, the motor 6 is started immediately and is in the power generating status, and the balancing counterbalance descends to the position at a height of 15M.

| | | | | | | | | | | |
|---|---|---|---|---|---|---|---|---|---|---|
| Initial | | | | | | | 15 | | | |
| 7 | 1 | 0 | 11 | 30 | 0 | 0 | 15 | 30 | 0 | -30 |
| 8 | 11 | 10 | 1 | -30 | 0.25 | 7.5 | 22.5 | -60 | 30 | 30 |
| 9 | 1 | 10 | 11 | 30 | 0.25 | -7.5 | 15 | 60 | -30 | -30 |
| 10 | 11 | 0 | 1 | -30 | 0 | 0 | 15 | -30 | 0 | 30 |
| 11 | 1 | 10 | 11 | 30 | 0.25 | -7.5 | 7.5 | 60 | -30 | -30 |
| 12 | 11 | 5 | 9 | -6 | 0.125 | 0.75 | 8.25 | -9 | 3 | 6 |
| 13 | 9 | 8 | 10 | 3 | 0.2 | -0.6 | 7.65 | 5.4 | -2.4 | -3 |
| 14 | 10 | 2 | 7 | -9 | 0.05 | 0.45 | 8.1 | -10.8 | 1.8 | 9 |
| 15 | 7 | 5 | 3 | -12 | 0.125 | 1.5 | 9.6 | -18 | 6 | 12 |
| 16 | 3 | 0 | 8 | 15 | 0 | 0 | 9.6 | 15 | 0 | -15 |
| 17 | 8 | 10 | 11 | 9 | 0.25 | -2.25 | 7.35 | 18 | -9 | -9 |
| 18 | 11 | 0 | 8 | -9 | 0 | 0 | 7.35 | -9 | 0 | 9 |
| 19 | 8 | 11 | 11 | 9 | 0.275 | -2.475 | 4.875 | 18.9 | -9.9 | -9 |
| 20 | 11 | 0 | 1 | -30 | 0. | 0 | 4.875 | -30 | 0 | 30 |
| 21 | 1 | 11 | 3 | 6 | 0.275 | -1.65 | 3.225 | 12.6 | -6.6 | -6 |

The balancing counterbalance triggers the lower early warning position sensor 1.2 at a height of 3.51m, and the car levels to floor 3 nearby. In such circumstances, the motor 6 is started immediately and drags the balancing counterbalance to rise to the position at a height of 15M.

FIG. 3

ENERGY-SAVING TRACTION-TYPE ELEVATOR

CROSS REFERENCE TO RELATED APPLICATIONS

The present application is the US national stage of International Patent Application PCT/CN2014/093419 filed on Dec. 10, 2014, which, in turn, claims priority to Chinese Patent Application CN 201310695900.8 filed on Dec. 17, 2013.

TECHNICAL FIELD

The present invention relates to an energy-saving traction-type elevator and an energy-saving method thereof, belonging to the field of elevator energy saving.

DESCRIPTION OF THE RELATED ART

It is well known that, as elevators are a kind of a vertical transport tool, the car (load) and counterweight both have potential energy features. During working, an elevator carries approximately the same mass up and downward, and in terms of energy conservation, the power loss of the elevator only meets friction heating. In terms of mechanical energy, the elevator is in an ideal status if the elevator car (load) is equal to a counterweight. Usually, the ratio of the counterweight to the car weight is 1.5:1, and the load varies frequently, so it is difficult to the elevator to get in the ideal status.

The function of the counterbalance system of the elevator is to drive the counterbalance unit and the car (load) reach relative balance. During working, the elevator can make sure that the difference between the counterbalance unit and the car (load) keeps at a such small value that the elevator is in a relative ideal status even if the load changes. On the contrary, if the counterbalance unit and the car have a weight difference, the working of the elevator inevitably results in accumulation and release of the mechanical potential energy, thereby causing waste of energy.

At present, various energy-saving elevators are available, for example variable counterbalancing energy-saving elevator and energy-saving elevator recovering an auxiliary counterbalancing unit by the potential energy. Among those elevators, the counterbalancing mass is varying, which means that all have actions of assembling and dismantling the counterbalance unit.

The prior art has at least the following problems: the existing variable counterbalancing elevator can reduce the drive moment and power of the traction machine and fulfill the aim of saving energy and improving the service life of the traction machine; however, the assembling and dismantling of the counterbalance unit inevitably results in power loss; meanwhile, if the load changes dramatically, many counterbalance units are required to be assembled and dismantled, thereby wasting time.

CONTENT OF THE PRESENT INVENTION

To fulfill the aim of overcoming defects in the prior art, the present invention provides an energy-saving traction-type elevator which has a simple and rational structure and can use the principle of moment balance to effectively realize elevator energy saving and storage and release of the potential energy, and an energy saving method.

To solve the defects in the prior art, the present invention provides an energy-saving traction-type elevator. The elevator includes at least one counterbalance unit; each counterbalance unit includes a traction machine, an automatic transmission, a hoist-type lifting mechanism, a power-generating electric motor, a controller which are provided in a machine room and a car, a fixed counterweight and a balancing counterbalance which are provided in an elevator shaft.

An output shaft of said traction machine is connected with an input of the automatic transmission; an output shaft of the automatic transmission is connected with one end of a rotating shaft of the hoist-type lifting mechanism through a first coupling and the other end of the rotating shaft of the hoist-type lifting mechanism is connected with a motor shaft of the power-generating electric motor.

The car and the fixed counterweight are suspended on the traction machine through steel cables; the car is internally provided with a weighing device; the balancing counterbalance is suspended on the hoist-type lifting mechanism through a steel cable; the balancing counterbalance is installed in a vertically disposed guide rail and the balancing counterbalance is provided with a position sensor on the upper and lower sides respectively.

The traction machine, the automatic transmission, a clutch, the power-generating electric motor, the weighing device and the position sensors all are connected with the controller through cable and are under the control of the controller.

The position sensors are an upper limit position sensor, an upper early warning position sensor, a lower early warning position sensor and a lower limit position sensor in turn from the upside down, wherein, the upper limit position sensor and the upper early warning position sensor are located in the shaft on the upper side of the balancing counterbalance; the lower early warning position sensor and the lower limit position sensor are located in the shaft on the lower side of the balancing counterbalance; the between the upper limit position sensor and the upper early warning position sensor and between the lower early warning position sensor and the lower limit position sensor are both a safety distance.

The hoist-type lifting mechanism includes a roller installed on the rotating shaft, and the steel cable of the balancing counterbalance or the cable of the movable pulley is installed on the roller.

Between the traction machine and the fixed counterweight is disposed a steel cable tension pulley.

An energy saving method of energy saving model of traction machine includes the following steps.

a. The weighing device acquires an overall weight value of the car in real time, converts the weight value into a control signal and sends the control signal to the controller.

b. The controller compares the acquired weight value and a preset value range and controls the automatic transmission to perform an energy-saving operation, wherein the operation is as follows:

when the weight value is lower than the lower limit of the set value, the automatic transmission is started to drive the hoist-type lifting mechanism to increase or decrease the balancing counterbalance, and transmit the torque generated by lifting the balancing counterbalance to the car, wherein, the sum of the rotating torque generated by the balancing counterbalance and the rotating torque generated by the car is equal to the rotating torque generated by the fixed counterweight;

when the counterweight is within the range of the set value, the two ends of the steel cable on the traction machine are stressed to be balance while the clutch opens, and the balancing counterbalance does not take part in elevator movement;

when the weight value is higher than the upper limit of the set value, the automatic transmission is started to drive the hoist-type lifting mechanism to increase or decrease the balancing counterbalance, and transmit the torque generated by lifting the balancing counterbalance to the fixed counterweight, wherein, the sum of the rotating torque generated by the balancing counterbalance and the rotating torque generated by the fixed counterweight is equal to the rotating torque generated by the car.

c. The traction machine lifts or descends the car.

d. When the balancing counterbalance moves to reach the upper early warning position sensor, triggering the upper early warning position sensor to send an early warning signal; when the car moves to the nearest level, controlling the power-generating electric motor to be started by the controller to descend the balancing counterbalance to a safe position, and then repeating steps a, b and c;

when the balancing counterbalance moves to reach the lower early warning position sensor, triggering the lower early warning position sensor to send an early warning signal; when the car moves to the nearest level, controlling the power-generating electric motor to be started by the controller to lift the balancing counterbalance to a safe position, and then repeating steps a, b and c;

when the car triggers the upper or lower limit position sensor when moving to the nearest level, stopping the elevator from running, and starting the power-generating electric motor to move the balancing counterbalance to a safe position, by the controller, and then repeating steps a, b and c.

The weight of the car without load is defined as one unit, and the weight of the car with a full load is defined as n units, wherein n is greater than 1; the set value is in the range of 1 and n, and the weight of the fixed counterweight is in the range of the set value and the weight of the balancing counterbalance is at least one unit.

Preferably, step d is as follows:

when the balancing counterbalance moves to reach the upper early warning position sensor, the upper early warning position sensor is triggered to send an early warning signal; when the car moves to the nearest level, the clutch opens, the fixed counterweight, the traction machine and the car form a traditional elevator structure and the formed elevator structure runs according to the traditional elevator mode; meanwhile, the controller controls the power-generating electric motor to be started to descend the balancing counterbalance to a safe position by the controller, and then steps a, b and c are repeated;

when the balancing counterbalance moves to reach the lower early warning position sensor, the lower early warning position sensor is triggered to send an early warning signal; when the car moves to the nearest level, the clutch opens, the fixed counterweight, the traction machine and the car form a traditional elevator structure and the formed elevator structure runs according to the traditional elevator mode; meanwhile, the controller controls the power-generating electric motor be started to lift the balancing counterbalance to a safe position by the controller, and then steps a, b and c are repeated;

when the car triggers the upper or lower limit position sensor when moving to the nearest level, the controller stops the elevator from running; the clutch opens; the fixed counterweight, the traction machine and the car form the traditional elevator structure; the elevator structure runs according to the traditional elevator mode; meanwhile, the power-generating electric motor is started to move the balancing counterbalance to the safe position; and then steps a, b and c are repeated.

As an optimization, the weight of the car without load is defined as one unit, and the weight of the car with a full load is defined as n units, wherein n is greater than 1; the set value is in the range of 1 and n, and the weight of the fixed counterweight is one unit; and the weight of the balancing counterbalance is at least one unit.

As an optimization, the weight of the car without load is defined as one unit, and the weight of the car with a full load is defined as n units, wherein n is greater than 1; the set value is in the range of 1 and n, and the weight of the fixed counterweight is n unit and the weight of the balancing counterbalance is at least one unit.

The storage and release of the elevator potential energy is completed during rise and fall of the balancing counterbalance; when actively descending from a higher position, the balancing counterbalance applies work to the power-generating motor, converts the potential energy into electricity and feeds the electricity to the power grid, realizing recovery of energy.

The present invention has the following beneficial effects: by using the principle of moment balancing and adding the independent balancing counterbalance for elevator to realize the smart counterbalancing of the elevator, the elevator reaches a relative balance status, thereby reducing the traction moment and power of the traction machine, when the potential energy of the balancing counterbalance of the elevator builds up a higher position, the power-generating electric motor can perform centralized power generation, aiding energy recovery and use; the effects of effective energy-saving and extended service life of the traction machine are achieved by storing, releasing and recovering the potential energy.

BRIEF DESCRIPTION OF THE ATTACHED DRAWINGS

FIG. 3 shows a table of operation cases in one embodiment of the present invention.

DETAILED DESCRIPTION OF THE EMBODIMENTS OF THE PRESENT INVENTION

Figure 1:
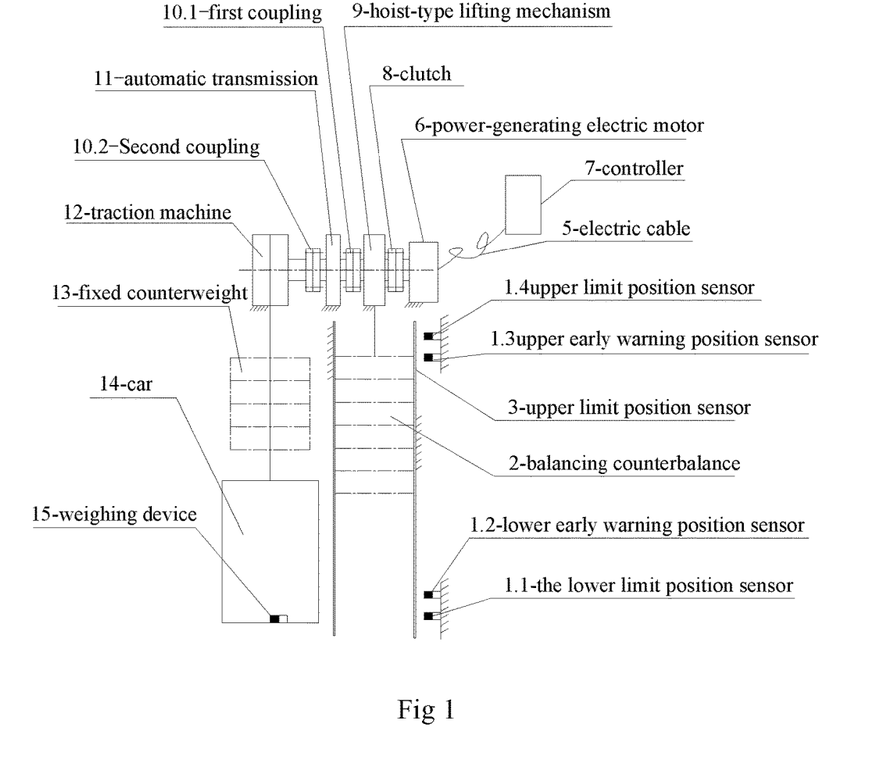
FIG. 1 is a structure of the present invention.
Figure 2:
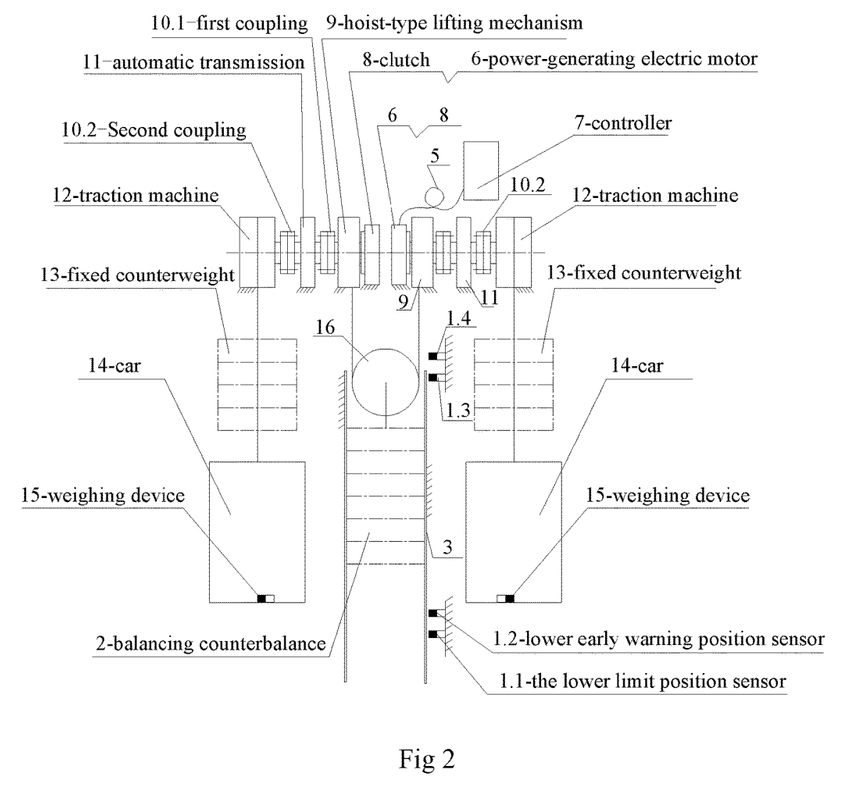
FIG. 2 is another structure of the present invention.

The present invention is described in detail with reference to the attached drawings. As shown in FIGS. 1 and 2, an elevator includes at least one counterbalance unit; each counterbalance unit includes a traction machine 12, an automatic transmission 11, a hoist-type lifting mechanism 9, a power-generating electric motor 6, a controller 7 which are provided in a machine room and a car 14, a fixed counterweight 13 and a balancing counterbalance 2 which are provided in an elevator shaft;

an output shaft of said traction machine is connected with an input of the automatic transmission 11; an output shaft of the automatic transmission 1 is connected with one end of a rotating shaft of the hoist-type lifting mechanism 9 through a first coupling 10.1; the other end of the rotating shaft of the hoist-type lifting mechanism 9 is connected with a motor shaft of the power-generating electric motor 6;

the car 14 and the fixed counterweight 13 are suspended on the traction machine 12 through steel cables; the car is internally provided with a weighing device 15; the balancing counterbalance 2 is suspended on the hoist-type lifting mechanism 9 through a steel cable; the balancing counterbalance is installed in a vertically disposed guide rail 3; the balancing counterbalance is provided with a position sensor on the upper and lower sides respectively;

the traction machine 12, the automatic transmission 11, the hoist-type lifting mechanism 9, a clutch 8, the power-generating electric motor 6; and, the weighing device 15 and the position sensors all are connected with the controller 7 through cable and are under the control of the controller 7.

The automatic transmission is of prior art, having speed changing, steering and clutching functions. The automatic transmission can realize forward rotation and backward rotation inwards through a three-star-wheel steering mechanism inside, achieving the steering function, thereby selecting to add the balancing counterbalance to the car side or counterweight side according to the operating load of the car; in the automatic transmission, the gear system performs switching of the shifts and selects different transmission ratio to realize the speed change function, thereby outputting different torque.

The shaft of the automatic transmission can transmit the torque of the balancing counterbalance. The torque can deduct the resistance torque caused by difference in weights on two sides of the traction machine, thereby reducing work of the traction machine.

As shown in FIG. 2, the application of the present invention is in various modes. The elevator can also include two counterbalance units; the two counterbalance units share one balancing counterbalance 2; the balancing counterbalance 2 is suspended on a movable pulley 16; and the movable pulley is suspended between the hoist-type lifting mechanism 9 of two counterbalance units.

The position sensors are an upper limit position sensor 1.4, an upper early warning position sensor 1.3, a lower early warning position sensor 1.2 and a lower limit position sensor 1.1 in turn from the upside down; wherein, the upper limit position sensor 1.4 and the upper early warning position sensor 1.3 are located in the shaft on the upper side of the balancing counterbalance; the lower early warning position sensor 1.2 and the lower limit position sensor 1.1 are located in the shaft on the lower side of the balancing counterbalance; the between the upper limit position sensor 1.4 and the upper early warning position sensor 1.3 and between the lower early warning position sensor 1.2 and the lower limit position sensor 1.1 are both a safety distance.

The hoist-type lifting mechanism 9 includes a roller installed on the rotating shaft, and the steel cable of the balancing counterbalance 2 or the cable of the movable pulley 34 are installed on the roller.

Between the traction machine 12 and the fixed counterweight 13 is disposed a steel cable tension pulley, improving the friction force between the steel cable and the traction machine.

An energy saving method of energy saving model of traction machine includes the following steps:

a. The weighing device acquires an overall weight value of the car in real time, converts the weight value into a control signal and sends the control signal to the controller.

b. The controller compares the acquired weight value and a preset value range and controls the automatic transmission to perform an energy-saving operation, wherein the operation is as follows:

when the weight value is lower than the lower limit of the set value, the automatic transmission is started to drive the hoist-type lifting mechanism to increase or decrease the balancing counterbalance, and converts the weight of the balancing counterbalance into a torque and sends the torque to the car such that the two ends of the steel cable on the traction machine are stressed and balanced; in such circumstances, the sum of the rotating torque generated by the balancing counterbalance and the rotating torque generated by the car is equal to the rotating torque generated by the fixed counterweight; when the weight value is in the range of the set value, the two ends of the steel cable on the traction machine are stressed and balance, then the clutch opens, and the balancing counterbalance does not take part in the elevator movement;

when the weight value is higher than the upper limit of the set value, the automatic transmission is started to drive the hoist-type lifting mechanism to increase or decrease the balancing counterbalance, and convert the weight of the balancing counterbalance into a torque and transmit the torque to the fixed counterweight such that the weights at the two end of the steel cable of the traction machine are balanced, wherein, the sum of the rotating torque generated by the balancing counterbalance and the rotating torque generated by the fixed counterweight is equal to the rotating torque generated by the car.

c. The traction machine lifts or descends the car.

d. When the balancing counterbalance moves to reach the upper early warning position sensor, the upper early warning position sensor is triggered to send an early warning signal; when the car moves to the nearest level, the clutch opens, the fixed counterweight, the traction machine and the car form a traditional elevator structure and the formed elevator structure runs according to the traditional elevator mode; meanwhile, the controller controls the power-generating electric motor to be started to descend the balancing counterbalance to a safe position by the controller, and then steps a, b and c are repeated;

when the balancing counterbalance moves to reach the lower early warning position sensor, the lower early warning position sensor is triggered to send an early warning signal; when the car moves to the nearest level, the clutch opens, the fixed counterweight, the traction machine and the car form a traditional elevator structure and the formed elevator structure runs according to the traditional elevator mode; meanwhile, the controller controls the power-generating electric motor be started to lift the balancing counterbalance to a safe position by the controller, and then steps a, b and c are repeated;

when the car triggers the upper or lower limit position sensor when moving to the nearest level, the controller stops the elevator from running; the clutch opens; the fixed counterweight, the traction machine and the car form the traditional elevator structure; the elevator structure runs according to the traditional elevator mode; meanwhile, the power-generating electric motor is started to move the balancing counterbalance to the safe position; and then steps a, b and c are repeated.

The weight of the car without load is defined as one unit, and the weight of the car with a full load is defined as n units, wherein n is greater than 1; the set value is in the range of 1 and n, and the weight of the fixed counterweight is in the range of the set value; the set value meets the national safety standard; and the weight of the balancing counterbalance is at least one unit.

The actual application of the elevator is relatively complicated. At different sites, the elevator car bears different loads during running. The following are detailed description of the fixed counterweight, balancing counterbalance and set value by taking no load case and full load case as the examples.

In a residential cell, an elevator usually runs without a load. To fulfill the energy-saving aim, the weight of the car without a load is defined as one unit, while the weight of the car with a full load is defined as n units, wherein is greater than 1; the set value is in the range of one unit and u units, wherein the weight of the fixed counterweight is one unit; the weight of the balancing counterbalance is at least one unit; weights of the fixed counterweight and the car are the same in case of no load, so when the elevator is running, the car weight must be greater than the weight of the fixed counterweight as long as a person stays in the elevator; in order to reach the balance between the two sides of the traction machine, the automatic transmission converts he weight of the balancing counterbalance into a torque and applies the torque to the fixed counterweight; in such case, the torques on the two sides of the traction machine are balanced, the traction machine lifts or descends the car to reach the aim of energy saving.

In a hospital building, an elevator usually runs with a full load. To fulfill the energy-saving aim, the weight of the car without a load is defined as one unit, while the weight of the car with a full load is defined as n units, wherein is greater than 1; the set value is in the range of one unit and u units, wherein the weight of the fixed counterweight is n units; the weight of the balancing counterbalance is at least one unit; weights of the fixed counterweight and the car are the same in case of full load, so when the elevator is running, the car weight must be smaller than the weight of the fixed counterweight as long as the elevator is not in full load; in order to reach the balance between the two sides of the traction machine, the automatic transmission converts he weight of the balancing counterbalance into a torque and applies the torque to the car; in such case, the torques on the two sides of the traction machine are balanced, the traction machine lifts or descends the car to reach the aim of energy saving.

It is required to be noted that, the set value range is a preset quantity value. Different from a fixed set value, the set value in this embodiment of the present invention is set as a range value. Considering that during the actual movement of the elevator, the number of persons and the weight of each person in the car are different, and are difficult to reach consistency with a fixed set value, so setting the set value as a range value is more user-friendly. For example, in the hospital building, the range of the set value may be 0.9n_n unit; in a cell, the range of the set value may be 1-1.1; the range of the set value is not greater as long as the counterweight belongs to the range of the set value.

The storage and release of the elector potential energy is completed during rise and fall of the balancing counterbalance; when triggering the upper limit position sensor or the upper early warning position sensor and then descending, the balancing counterbalance applies work to the power-generating motor, converts the potential energy into electricity and feeds the electricity to the power grid, realizing recovery of energy.

Working principle of the present invention: the weighing device 15 is used to measure the load change of the elevator car 14, and before the car is closed and started, sends the measured result in form of analogue signal to the controller 7; the controller 7 determines whether or not starting the balancing counterbalance 2 according a stored algorithm program, and if startup is needed, controls the automatic transmission 11 to perform the transmission ratio such that the weights on the counterweight side and car side of the elevator reach a relative balance, thereby reducing the traction torque and power of the traction machine. When the balancing counterbalance 2 runs between the lower early warning position and upper warning position, the balancing counterbalance 2 plays the role of storing and releasing potential energy. When the balancing counterbalance 2 triggers the lower early warning position sensor 1.2, the car 14 performs leveling nearby in the running direction, and the power-generating electric motor 6 is started to lift the balancing counterbalance 2 to a rational position. When the balancing counterbalance 2 triggers the upper early warning position sensor 1.4, the car 14 performs leveling nearby in the running direction, and the power-generating electric motor 6 is started to descend the rational position to generate electricity, and in such circumstances, the balancing counterbalance plays the role of recovering the potential energy.

The following is an example of application of the structure of the present invention.

As shown in FIG. 1, a common elevator is improved in structure in the following way, the rotating shaft of the original traction machine is added with an extending shaft; the extending shaft is linked with the automatic transmission 11 through a coupling 10.2; the automatic transmission 11 is fixed on the ground, while the other end thereof is linked with the hoist-type lifting mechanism 9 through the coupling 10.1, and the latter is suspended with a balancing counterbalance 2; the other end of the hoist-type lifting mechanism 9 is connected with the power-generating electric motor 6 through the clutch 8, and in order to feed back the position of the balancing counterbalance 2, the shaft is equipped with four position sensors.

To more simply describe the application of the first embodiment of the present invention, assuming that the net weight of an elevator car in a certain residential cell is one ton, fixed counterweight 1 ton, capacity 1 ton (10 persons, 100 KG each person), balancing counterbalance 4 ton, and weight of the steel cable neglected; the building has 11 floors, 3M high each floor; the hoist-type lifting mechanism 9 can reach 25M; the installation height of the lower limit position sensor 1.1 is 0.5 m, the lower early warning position sensor 1.2 is 3.5 m, the upper early warning position sensor 1.3 is 26.4 m, and the limit position sensor 1.4 is 29.5M, which means that the normal operation height range of the balancing counterbalance 2 is in the height range of 3.51 M-26.4M. Under the condition of no consideration on the friction loss, the operation cases of the energy-saving elevator of the present invention can be seen in table 1.

Refer to Table 1. Considering 11 types of load changes, namely 0-10 persons, the automatic transmission has 11 types of transmission ratio. This is an ideal situation. The actual application may proceed with fewer transmission ratios, as long as the masses on the car side and the fixed counterweight side are basically the same. Besides, the unit of the energy is ton/m.

From the description above, it is known that, the energy-saving elevator of the present invention has three running status, namely an operating status where the balancing counterbalance is normal, power generating status in where balancing counterbalance descends from a higher position and power-consuming status where the balancing counterbalance rises from a lower position.

Additionally, the embodiment of the present invention also has advantages of solving the problem of the fixed counterweight of the common elevator and ensuring that the weights on the counterweight side and the car side of the elevator reaches relative balance; the torque balancing principle is employed; the design is rational; the structure is compact; the work of the traction machine of the elevator is reduced; the extra power consumption is low while the storage, release and recovery of the potential energy is released; when the potential energy of the balancing counterbalance of the elevator builds up a higher position, centralized power generation can be implemented, aiding recovery of the electric energy.

The present invention is not limited to the above embodiments. Any changes in shape or material, as long as the structural design provided by the present invention is used, belong to the one modification of the present invention and shall fall within the protective scope of the present invention.

What is claimed is:

1. An energy-saving traction-type elevator comprising at least one counterbalance unit, wherein
    each counterbalance unit comprises a traction machine, an automatic transmission, a hoist-type lifting mechanism, a power-generating electric motor, a controller provided in a machine room and a car, a fixed counterweight and a balancing counterbalance provided in an elevator shaft;
    an output shaft of said traction machine is connected with an input of the automatic transmission; an output shaft of the automatic transmission is connected with one end of a rotating shaft of the hoist-type lifting mechanism through a first coupling; and the other end of the rotating shaft of the hoist-type lifting mechanism is connected with a motor shaft of the power-generating electric motor;
    the car and the fixed counterweight are suspended on the traction machine through steel cables; the car is internally provided with a weighing device; the balancing counterbalance is suspended on the hoist-type lifting mechanism through a steel cable; the balancing counterbalance is installed in a vertically disposed guide rail; and the balancing counterbalance is provided with a position sensor on the upper and lower sides respectively;
    the traction machine, the automatic transmission, a clutch, the power-generating electric motor, the weighing device and the position sensors are all connected with the controller through cable and are under the control of the controller.

2. The energy-saving traction-type elevator according to claim 1, wherein said elevator comprises two counterbalance units sharing a balancing counterbalance there-between; wherein
    the balancing counterbalance is suspended on a movable pulley; and the movable pulley is suspended between the hoist-type lifting mechanism of two counterbalance units.

3. The energy-saving traction-type elevator according to claim 1 or 2, wherein the position sensors are an upper limit position sensor and an upper early warning position sensor, wherein
    a lower early warning position sensor and a lower limit position sensor in turn from the upside down; wherein, the upper limit position sensor and the upper early warning position sensor are located in the shaft on the upper side of the balancing counterbalance; the lower early warning position sensor and the lower limit position sensor are located in the shaft on the lower side of the balancing counterbalance; the between the upper limit position sensor and the upper early warning position sensor and between the lower early warning position sensor and the lower limit position sensor are both a safety distance.

4. The energy-saving traction-type elevator according to claim 3, wherein the hoist-type lifting mechanism comprises a roller installed on the rotating shaft, and the steel cable of the balancing counterbalance or the cable of the movable pulley are installed on the roller.

5. An energy saving method of an energy-saving traction machine, said method comprising the following steps:
    a. acquiring an overall weight value of the car in real time, converting the weight value into a control signal and sending the control signal to a controller, by the weighing device;
    b. comparing the acquired weight value and a preset value range and controlling the automatic transmission to perform an energy-saving operation, by the controller, the operation being as follows:
    when the weight value is lower than the lower limit of the set value, the automatic transmission is started to drive the hoist-type lifting mechanism to increase or decrease the balancing counterbalance, and transmit the torque generated by lifting the balancing counterbalance to the car, wherein, the sum of the rotating torque generated by the balancing counterbalance and the rotating torque generated by the car is equal to the rotating torque generated by the fixed counterweight;
    when the counterweight is within the range of the set value, the two ends of the steel cable on the traction machine are stressed to be balance while the clutch opens, and the balancing counterbalance does not take part in elevator movement;
    when the weight value is higher than the upper limit of the set value, the automatic transmission is started to drive the hoist-type lifting mechanism to increase or decrease the balancing counterbalance, and transmit the torque generated by lifting the balancing counterbalance to the fixed counterweight, wherein, the sum of the rotating torque generated by the balancing counterbalance and the rotating torque generated by the fixed counterweight is equal to the rotating torque generated by the car;
    c. lifting or descending the car by the traction machine;
    d. when the balancing counterweight moves to reach the upper early warning position sensor, triggering the upper early warning position sensor to send an early warning signal; when the car moves to the nearest level, controlling the power-generating electric motor to be started by the controller to descend the balancing counterbalance to a safe position, and then repeating steps a, b and c;
    d. when the balancing counterbalance moves to reach the lower early warning position sensor, triggering the lower early warning position sensor to send an early warning signal;
    when the car moves to the nearest level, controlling the power-generating electric motor to be started by the controller to lift the balancing counterbalance to a safe position, and then repeating steps a, b and c;
    when the car triggers the upper or lower limit position sensor when moving to the nearest level, stopping the elevator from running, and starting the power-generating electric motor to move the balancing counterbalance to a safe position, by the controller, and then repeating steps a, b and c.

6. The energy-saving method of an energy-saving traction machine according to claim 5, wherein said step d is as follows:
   when the balancing counterbalance moves to reach the upper early warning position sensor, the upper early warning position sensor is triggered to send an early warning signal; when the car moves to the nearest level, the clutch opens, the fixed counterweight, the traction machine and the car form a traditional elevator structure and the formed elevator structure runs according to the traditional elevator mode; meanwhile, the controller controls the power-generating electric motor to be started to descend the balancing counterbalance to a safe position by the controller, and then steps a, b and c are repeated;
   when the balancing counterbalance moves to reach the lower early warning position sensor, the lower early warning position sensor is triggered to send an early warning signal; when the car moves to the nearest level, the clutch opens, the fixed counterweight, the traction machine and the car form a traditional elevator structure and the formed elevator structure runs according to the traditional elevator mode; meanwhile, the controller controls the power-generating electric motor be started to lift the balancing counterbalance to a safe position by the controller, and then steps a, b and c are repeated;
   when the car triggers the upper or lower limit position sensor when moving to the nearest level, the controller stops the elevator from running; the clutch opens; the fixed counterweight, the traction machine and the car form the traditional elevator structure; the elevator structure runs according to the traditional elevator mode; meanwhile, the power-generating electric motor is started to move the balancing counterbalance to the safe position; and then steps a, b and c are repeated.

7. The energy-saving method of an energy-saving traction machine according to claim 5, wherein the weight of the car without load is defined as one unit, and the weight of the car with a full load is defined as n units, wherein n is greater than 1; the set value is in the range of 1 and n, and the weight of the fixed counterweight is in the range of the set value; and the weight of the balancing counterbalance is at least one unit.

8. The energy-saving method of an energy-saving traction machine according to claim 5, wherein the weight of the car without load is defined as one unit, and the weight of the car with a full load is defined as n units, wherein n is greater than 1;
   the set value is in the range of 1 and n, and the weight of the fixed counterweight is one unit;
   and the weight of the balancing counterbalance is at least one unit.

9. The energy-saving method of an energy-saving traction machine according to claim 5, wherein the weight of the car without load is defined as one unit, and the weight of the car with a full load is defined as n units, wherein n is greater than 1;
   the set value is in the range of 1 and n, and the weight of the fixed counterweight is n units;
   and the weight of the balancing counterbalance is at least one unit.

10. The energy-saving traction-type elevator according to claim 2, wherein the position sensors are an upper limit position sensor and an upper early warning position sensor, wherein
   a lower early warning position sensor and a lower limit position sensor in turn from the upside down; wherein, the upper limit position sensor and the upper early warning position sensor are located in the shaft on the upper side of the balancing counterbalance; the lower early warning position sensor and the lower limit position sensor are located in the shaft on the lower side of the balancing counterbalance; the between the upper limit position sensor and the upper early warning position sensor and between the lower early warning position sensor and the lower limit position sensor are both a safety distance.

11. The energy-saving method of an energy-saving traction machine according to claim 6, wherein the weight of the car without load is defined as one unit, and the weight of the car with a full load is defined as n units, wherein n is greater than 1;
   the set value is in the range of 1 and n, and the weight of the fixed counterweight is in the range of the set value; and the weight of the balancing counterbalance is at least one unit.

12. The energy-saving method of an energy-saving traction machine according to claim 6, wherein the weight of the car without load is defined as one unit, and the weight of the car with a full load is defined as n units, wherein n is greater than 1;
   the set value is in the range of 1 and n, and the weight of the fixed counterweight is one unit;
   and the weight of the balancing counterbalance is at least one unit.

13. The energy-saving method of an energy-saving traction machine according to claim 6, wherein the weight of the car without load is defined as one unit, and the weight of the car with a full load is defined as n units, wherein n is greater than 1;
   the set value is in the range of 1 and n, and the weight of the fixed counterweight is n units;
   and the weight of the balancing counterbalance is at least one unit.

* * * * *